May 25, 1937.　　　　E. A. MARSKI　　　　2,081,490
AIRPLANE
Filed Sept. 24, 1934　　　2 Sheets-Sheet 2
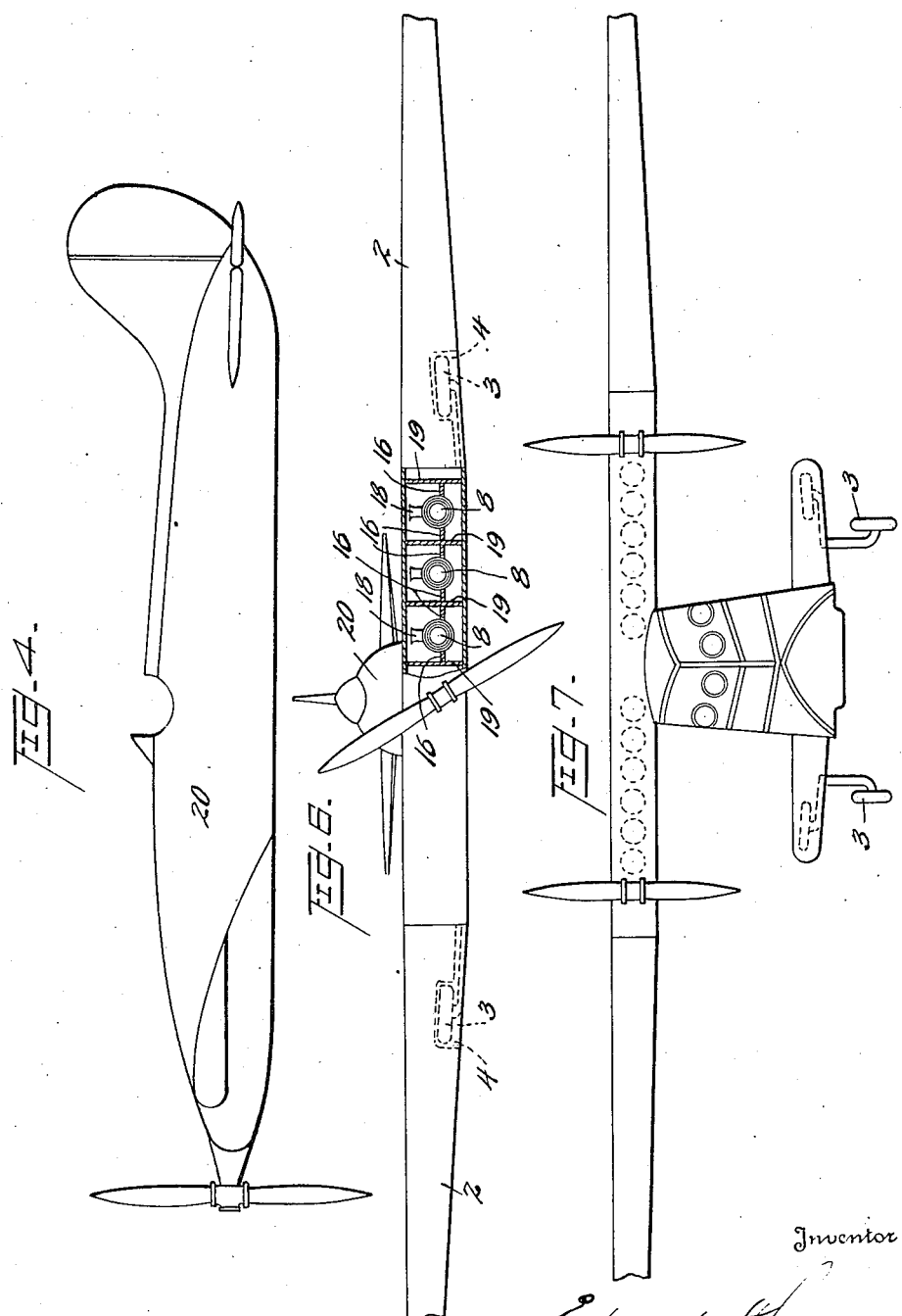
Inventor
Edward A. Marski
By
Attorney Patented May 25, 1937

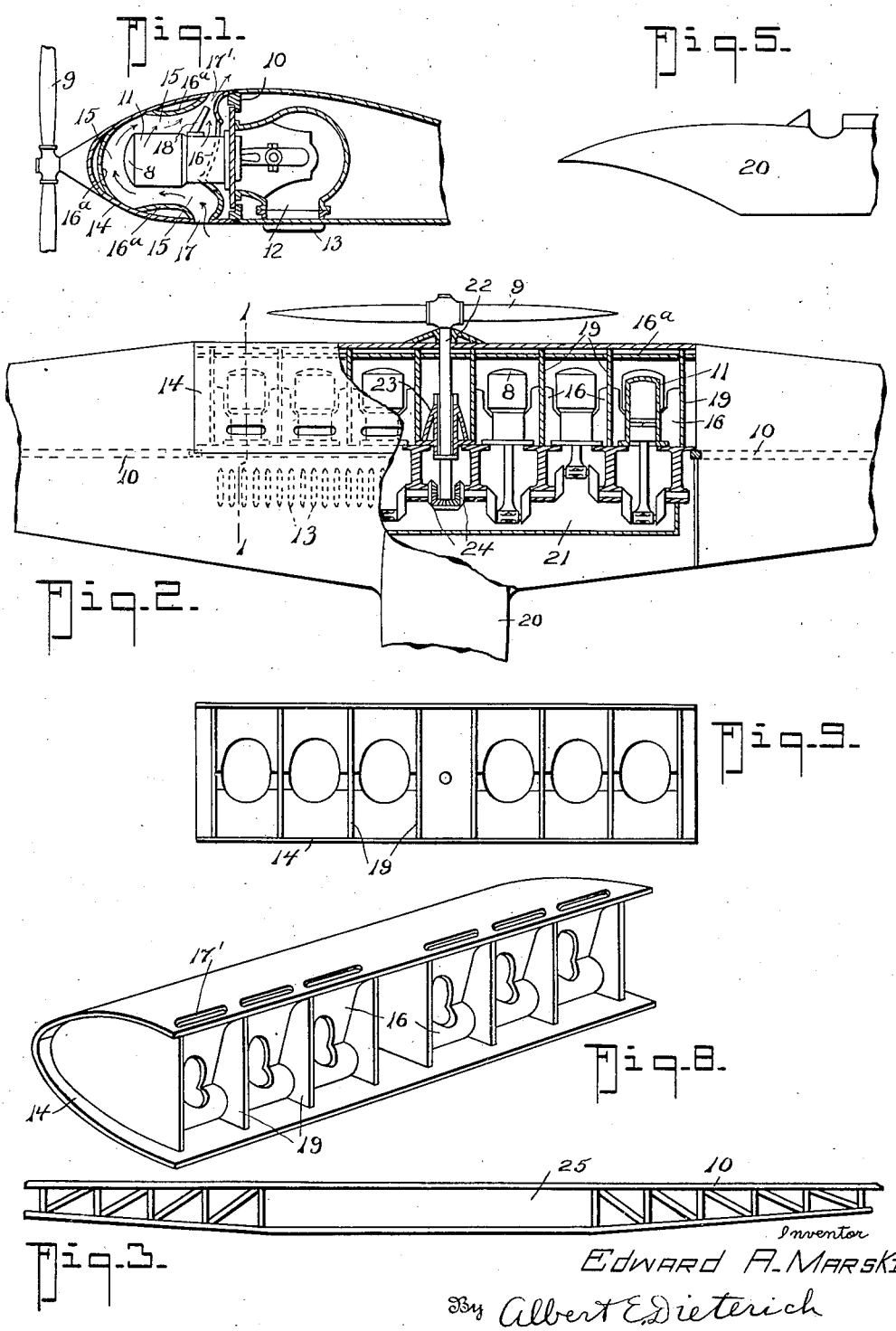

2,081,490

UNITED STATES PATENT OFFICE

2,081,490

AIRPLANE

Edward A. Marski, Phoenix, Ariz.

Application September 24, 1934, Serial No. 745,312

18 Claims. (Cl. 244—55)

My invention relates to construction in airplanes, driven by one or more air cooled internal combustion engines, placed within the opening of the main spar of the airfoil, which opening is substantially vertically centralized in the said spar, having the cylinders extending forwardly in the direction of flight and the crankcase extending behind the said spar as described in my Patent No. 1,986,066, issued January 1, 1935. The purpose of the present invention is to obtain a technically more efficient plane where the air cooled engines, with their usual mountings, bracings, cowlings and engine nacelles would not be subject to parasitic resistance, and where better net efficiency is obtained by placing the power plant wholly within the airfoil, and to provide an air cooling system for such construction. The air cooling system is assisted by virtue of air dynamic characteristics and the so-called Venturi system in combination with the exhaust outlets.

The parts forming the air cooling apparatus are detachable from the wing to allow access to the engine when desirable; the outside of the apparatus being the front part of the wing itself. The cooling system consists of the opening at the bottom of the airfoil in the surface having positive pressure in normal flight and the air deflecting and guiding means within the forward portion of the wing which conduct the air in a desirable manner around the cylinders, with the outlet opening in the upper surface of the wing in the vicinity having negative pressure in normal flight with the exhaust so placed that it will increase the velocity of the cooling air by creating an injector or venturi action at the outlet opening.

It is therefore understood that the central part of the wing supporting the engines can not be less in thickness than the stroke of the engines, although the end portions of course may be tapered in chord and thickness. The engines being inserted in and supported by the spar will increase rigidity, and the plane will be unusually "clean", because the only exposed part will be the propeller shaft and the propeller itself.

It is therefore one object of my invention to provide an airplane with air cooled engines, the cylinders of which are shielded by the airfoil or wing surface, and to eliminate said air cooled engine drag entirely.

Another object of my invention is to provide an airplane of better and more economical performance, by placing the engines wholly within the airfoil and yet having the cylinders air cooled.

Another object of my invention is to improve the propeller efficiency, the propeller having a clearer field for the slip stream when mounted in front of the wing instead of in front of an engine that is open to the slip stream.

Another object of my invention is to improve the pilot's visibility in the most important direction.

Still another object of my invention is to be able to obtain different propeller speed ratios without increasing the number of parts or weight.

Other objects of my invention are to eliminate engine torque reaction entirely by having two engines neutralizing the torque reaction of each other, or where one engine is used, at least to prevent the torque reaction from affecting the lateral stability of the plane by arranging the crankshaft at right angles to the propeller shaft. Also by having the cylinder axes substantially parallel to the direction of flight and to each other and their partitions being evenly spaced, each cylinder will receive an equal amount of cooling. The exhausts, discharging at negative pressure, will also be cooled as a result of the cooling system.

The cooling system will become active as soon as the propeller revolves and of course its efficiency will be increased by the velocity of the air acting on the wing.

With these and other desirable objects in view, my invention consists in the arrangement, construction and combination of the various parts of my improved devices as described and shown in the accompanying drawings in which:

Fig. 1 is an enlarged detailed vertical longitudinal section on the line 1—1 of Fig. 2, embodying my invention according to the construction described herein.

Fig. 2 is a detailed horizontal section and part top plan view of the embodiment shown in Fig. 1.

Fig. 3 is the front elevation of the main spar showing the openings for the engine reception, with the ends of the spar broken off.

Fig. 4 is a side view of Fig. 2.

Fig. 5 is a side view of the front part of the fuselage shown fairing into the wing.

Fig. 6 is a front view elevation of the airplane structure shown in Figs. 1, 2, and 3.

Fig. 7 is a front elevation of a modification using two propellers and two engine units, in which the wings are extended from the sides of a cabin monoplane or amphibian, when one large unit is used propellers may be placed on opposite ends of the crank shaft.

Figure 8 is a detail perspective view of the removable wing section or air cooling apparatus.

Figure 9 is a rear elevation of the same.

Referring to Fig. 1, this figure represents a section of the central part of the airfoil with propeller 9 attached with its fairings at the center of thrust, and the engines 21 secured to the front spar 10—10 within the central part of the airfoil having their lubricating reservoir (oil pan) 12 exposed at the lower surface of the wing, with its air cooling fins 13—13 for oil cooling purposes and the detachable air cooling apparatus 14—14 conducting air in paths (shown by arrows) 15—15—15, the outside of the apparatus constituting the front part of the wing itself throughout the length of the engines; with openings 17—17', opening 17 being located at the bottom of the airfoil on the positive pressure side of the wing and opening 17' on the negative pressure side, the exhaust 18 being arranged so it will increase the velocity of the air flow in the air cooling system, this system at the same time supplying air to the engine intakes (not shown). The air guides 16—16 might be of different lengths, the longer would throw the cooling air more towards the heads of the cylinders, the shorter would allow the air to go more across the cylinders; air guides 16 are strengthened and supported by vertical partitions 19—19 shown in Fig. 2 and Fig. 6. Partitions 16—16 are not in contact with the cylinder fins as shown in Fig. 2, which arrangement allows part of the air to go across the cylinders. Partitions 19—19—19 shown in Fig. 2 and Fig. 6 serve as a means of vertically supporting and stiffening the air cooling apparatus, the outside of which constitutes a part of the wing itself; partitions 19—19—19 also stiffen semi-partitions 16—16 shown in Fig. 2 and Fig. 6 and form separate evenly spaced compartments thus distributing equal amounts of air to each cylinder. 17 or 17' might be one long opening extending the length of the engine, or separate openings for each cylinder of proper sizes; where practicable one could attach sliding valves to control the cooling system at these openings. 16a—16a are air guides extending from the front edge of the openings 17 to the front edge of the openings 17' and around the front of the cylinder heads and spaced from the cylinders.

In Fig. 2 the dotted lines 13—13—13 represent the cooling fins shown in full in Fig. 1. 20 is a part of the fuselage, 21 indicates the engine, 22 the propeller shaft with its support or bearing 23 and connected with suitable gears 24 on the crank shafts.

Fig. 3 shows the construction of the front spar with a rectangular opening 25 into which the engine unit or units may be set, and this spar 10 serves as a bed or support to which the engines are bolted.

Fig. 4 is a side view of Fig. 2 showing a low-wing monoplane of the pursuit type embodying stream-line possibilities, in which the fuselage 20 fairs gracefully into the wing 2.

Fig. 5 is the side view of the stream-line nose of the fuselage of Fig. 4.

Fig. 6 is the front elevation of the wing 2 partly broken away showing the cylinder heads 8, exhausts 18 and partitions 16 and 19 forming air cooled compartments for each cylinder. The cooling air comes from under partitions 16 and then goes up over and around the cylinders towards the opening 17' shown in Fig. 1. The exhausts 18—18 are flattened at the ends somewhat in the form of a fish tail, in order to cause a venturi action in combination with the similarly formed openings 17', as well as to muffle the exhaust to a certain degree. 3—3 are the wheels of a folding type of landing gear swung up into flying position in pockets 4 formed in the under side of the wings.

Among the many advantages arising from the use of my improved structure and provisions for an air cooling system for the same, is its adaptability to either a low or high wing monoplane, in small types as well as in very large types where auxiliary wings could be used with power plants giving extra lift and power at the same time, thus giving the advantage of shortening the main wing. It may be well to mention that at the present time the majority of cantilever monoplane wings have in their central portions more than the necessary thickness for engine placement, and gears can be obtained made of fabric or bakelite which are silent and lighter than those made of metal.

The advantage of the airplane construction and engine arrangement with provision for the air cooling system previously set forth will at once be apparent, with engine horizontally rather than vertically mounted permitting the motor to be carried within the wing of the airplane and allowing an efficiency heretofore not obtained.

Some changes may be made in the arrangement, construction and combination of the various parts of my improved devices without departing from the spirit of my invention, and it is my intention to cover by my claims such changes as may reasonably be included within the scope thereof.

The shape of the air cooled fins on the cylinders may be of any desired shape in order to direct the cooling air in relatively proper amounts to the different parts of the cylinders, so as to obtain efficient cooling thereof.

What I claim is:

1. In an airplane having an air cooled engine mounted in a wing, said wing having a main spar; an air cooling means comprising laterally elongated openings through the upper and lower surfaces of the wing, which openings are located in front of the main spar, the lower opening being located adjacent the place of maximum positive air-to-wing pressure and the upper opening being located adjacent the place of maximum negative air-to-wing pressure, the exhaust ducts of the engines being arranged to discharge toward the upper opening to increase the velocity of air flow from the lower opening to the upper opening through the wing.

2. In an airplane wing having a front spar, a multi-cylinder engine mounted in said wing on said spar with its cylinders extending forwardly of the spar and located within the contour of the wing, the wing adjacent the engine having a removable section which is provided with at least one opening in its bottom and at least one opening in its top and at least one air passage from opening to opening, and guide means in said passage for directing air which enters the bottom opening around the engine cylinders to the top opening, said engine having its exhaust duct arranged to deliver toward and through said opening for the purposes described.

3. In an airplane wing having a front spar, a multi-cylinder engine mounted in said wing on said spar with its cylinders extending forwardly of the spar and located within the contour of the wing, the wing adjacent the engine having a removable section which is provided with at least one opening in its bottom and at least one opening in its top and at least one air passage from opening to opening, and guide means in said passage for directing air which enters the bottom opening around the engine cylinders to the top opening, the lower opening, when the removable section is in place, being located at approximately the place of maximum air pressure in flight, the opening at the top, when the section is in place, being located at approximately the place of minimum air pressure when the plane is in flight, said engine having its exhaust duct arranged to deliver toward and through said top opening for the purposes described.

4. An airplane wing having a leading edge and a front spar; said wing including a removable section in front of said spar, an engine located in the wing with its cylinders projected forwardly of said spar into and within the confines of said removable section, means carried by said removable section for passing air through said section for the purpose of cooling the cylinders and for supplying air thereto for combustion, said means comprising bottom and top openings in said removable section, a guide for directing air in its passage from the bottom to the top opening, and partitions between the respective cylinders of the engine which partitions divide said removable section into individual cylinder cooling portions and serve as a stiffening means for said removable section.

5. An airplane wing having a leading edge and a front spar; said wing including a removable section in front of said spar, an engine located in the wing with its cylinders projected forwardly of said spar into and within the confines of said removable section, and means carried by said removable section for passing air through said section for the purpose of cooling the cylinders and for supplying air thereto for combustion, said engine having an exhaust duct directed to produce a venturi action for assisting in passing the air through said removable section, thereby adding to the action caused by the difference in pressures at the lower and upper openings in normal flight.

6. In an airplane wing having a front spar, a multi-cylinder engine mounted in said wing on said spar with its cylinders extending forwardly of the spar and located within the contour of the wing, the wing adjacent the engine having a removable section which is provided with at least one opening in its bottom and at least one opening in its top and at least one air passage from opening to opening, guide means in said passage for directing air which enters the bottom opening around the engine cylinders to the top opening, the opening at the top, when the section is in place, being located at approximately the place of minimum air pressure when the plane is in flight, said engine having exhaust ducts discharging at a place of negative air pressure.

7. An airplane wing having a front spar, said wing having a recess in its front edge extending to adjacent said spar, an engine mounted in the wing with its cylinders projecting forwardly into said recess, a removable cowling covering said recess, said cowling which is a part of the wing itself having air inlets in the bottom in front of the spar and air outlets in the top in front of the spar and air guides in the recess for directing the air from said inlets forwardly under said cylinders and upwardly around said cylinders and rearwardly to said outlets.

8. An airplane wing having a front spar, said wing having a recess in its front edge extending to adjacent said spar, an engine mounted in the wing with its cylinders projecting forwardly into said recess, a removable cowling covering said recess, said cowling having air inlets in the bottom and air outlets in the top and air guides in the recess for directing the air from said inlets over said cylinders to said outlets, and partitions in said recess between adjacent cylinders to divide said recess into individual compartments for the respective cylinders and to stiffen said removable cowling.

9. An airplane wing having a front spar and a chamber between said spar and the leading edge of the wing, an engine mounted in the wing with its cylinders located in said chamber, said wing having at least one air inlet in the bottom surface and at least one air outlet in the top surface, said inlets and outlets communicating with said chamber, and an air guide extending from the rear side of the inlet to the rear side of the outlet and having an opening for each cylinder.

10. An airplane wing having a front spar and a chamber between said spar and the leading edge of the wing, an engine mounted in the wing with its cylinders located in said chamber, said wing having at least one air inlet in the bottom surface and at least one air outlet in the top surface, said inlets and outlets communicating with said chamber, and an air guide extending from the rear side of the inlet to the rear side of the outlet and having an opening for each cylinder, said guide including an upwardly and forwardly curved portion beneath the cylinders and an upwardly and rearwardly curved portion above the cylinders.

11. An airplane wing having a front spar and a chamber between said spar and the leading edge of the wing, an engine mounted in the wing with its cylinders located in said chamber, said wing having at least one air inlet in the bottom surface and at least one air outlet in the top surface, said inlets and outlets communicating with said chamber, an air guide extending from the rear side of the inlet to the rear side of the outlet and having an opening for each cylinder, and a second air guide extending from the front side of the inlet to the front side of the outlet and forwardly curved around and spaced from the cylinder heads and cylinders.

12. An airplane wing having a front spar and a chamber between said spar and the leading edge of the wing, an engine mounted in the wing with its cylinders located in said chamber, said wing having at least one air inlet in the bottom surface and at least one air outlet in the top surface, said inlets and outlets communicating with said chamber, an air guide extending from the rear side of the inlet to the rear side of the outlet and having an opening for each cylinder, said guide including an upwardly and forwardly curved portion beneath the cylinders and an upwardly and rearwardly curved portion above the cylinders, and a second air guide extending from the front side of the inlet to the front side of the outlet and forwardly curved around and spaced from the cylinder heads and cylinders.

13. An airplane wing having a front spar and a chamber between said spar and the leading edge of the wing, an engine mounted in the wing with its cylinders located in said chamber, said wing having at least one air inlet in the bottom surface and at least one air outlet in the top surface, said inlets and outlets communicating with said chamber, an air guide extending from the rear side of the inlet to the rear side of the outlet and having an opening for each cylinder, and vertical partitions in said chamber located between and spaced from adjacent cylinders to divide said chamber into separate cooling compartments one for each cylinder, and to serve in part as alse ribs for the portion of the wing which is located at said chamber.

14. An airplane wing having a front spar and a chamber between said spar and the leading edge of the wing, an engine mounted in the wing with its cylinders located in said chamber, said wing having at least one air inlet in the bottom surface and at least one air outlet in the top surface, said inlets and outlets communicating with said chamber, an air guide extending from the rear side of the inlet to the rear side of the outlet and having an opening for each cylinder, said guide including an upwardly and forwardly curved portion beneath the cylinders and an upwardly and rearwardly curved portion above the cylinders, and vertical partition in said chamber located between and spaced from adjacent cylinders to divide said chamber into separate cooling compartments one for each cylinder, and to serve in part as false ribs for the portion of the wing which is located at said chamber.

15. An airplane wing having a front spar and a chamber between said spar and the leading edge of the wing, an engine mounted in the wing with its cylinders located in said chamber, said wing having at least one air inlet in the bottom surface and at least one air outlet in the top surface, said inlets and outlets communicating with said chamber, an air guide extending from the rear side of the inlet to the rear side of the outlet and having an opening for each cylinder, a second air guide extending from the front side of the inlet to the front side of the outlet and forwardly curved around and spaced from the cylinder heads and cylinders, and vertical partitions in said chamber located between and spaced from adjacent cylinders to divide said chamber into separate cooling compartments one for each cylinder, and to serve in part as false ribs for the portion of the wing which is located at said chamber.

16. An airplane wing having a front spar and a chamber between said spar and the leading edge of the wing, an engine mounted in the wing with its cylinders located in said chamber, said wing having at least one air inlet in the bottom surface and at least one air outlet in the top surface, said inlets and outlets communicating with said chamber, an air guide extending from the rear side of the inlet to the rear side of the outlet and having an opening for each cylinder, said guide including an upwardly and forwardly curved portion beneath the cylinders and an upwardly and rearwardly curved portion above the cylinders, a second air guide extending from the front side of the inlet to the front side of the outlet and forwardly curved around and spaced from the cylinder heads and cylinders, and vertical partitions in said chamber located between and spaced from adjacent cylinders to divide said chamber into separate cooling compartments one for each cylinder, and to serve in part as false ribs for the portion of the wing which is located at said chamber.

17. An airplane wing having a front spar and a chamber between said spar and the leading edge of the wing, an engine mounted in the wing with its cylinders located in said chamber, said wing having at least one air inlet in the bottom surface and at least one air outlet in the top surface, said inlets and outlets communicating with said chamber, an air guide extending from the rear side of the inlet to the rear side of the outlet and having an opening for each cylinder, said guide including an upwardly and forwardly curved portion beneath the cylinders and an upwardly and rearwardly curved portion above the cylinders, a second air guide extending from the front side of the inlet to the front side of the outlet and forwardly curved around and spaced from the cylinder heads and cylinders, and vertical partitions in said chamber located between and spaced from adjacent cylinders to divide said chamber into separate cooling compartments one for each cylinder, and to serve in part to stiffen the portion of the wing which is located at said chamber, said guides and said partitions and that portion of the wing's covering embracing said chamber being removable.

18. An airplane wing having a leading edge and a front spar; a multi-cylinder engine mounted in said wing with its cylinders extending forwardly of the spar but located within the contour of the wing, the wing adjacent the engine having at least one opening in its bottom and at least one opening in its top providing an air passage through the wing around the engine cylinders, said openings being located respectively in the vicinity of maximum and minimum air pressures, the exhausts of the engine being directed so as to increase the velocity of air flow through the wing, and vertical partitions in the wing between adjacent engine cylinders to provide individual air flow compartments for the purpose specified.

EDWARD A. MARSKI.